United States Patent [19]
McCurry

[11] Patent Number: 5,445,198
[45] Date of Patent: Aug. 29, 1995

[54] ROUTER SUB-BASE

[75] Inventor: Ronald C. McCurry, West Union, S.C.

[73] Assignee: Ryobi Motor Products Corporation, Easley, S.C.

[21] Appl. No.: 299,207

[22] Filed: Aug. 31, 1994

[51] Int. Cl.6 .............................................. B27C 5/10
[52] U.S. Cl. ................... 144/134 D; 144/1 F; 144/136 C; 409/182
[58] Field of Search ............... 144/1 F, 134 R, 134 D, 144/136 R, 136 C; 409/125, 130, 182

[56] References Cited

U.S. PATENT DOCUMENTS

| Re. 33,045 | 9/1989 | Gronholz et al. | 144/134 D |
|---|---|---|---|
| 2,943,655 | 7/1960 | Pedersen et al. | 144/136 |
| 3,119,207 | 1/1964 | Nall | 51/170 |
| 3,635,268 | 1/1972 | Lange | 144/134 D |
| 4,044,805 | 8/1977 | Gronholz | 144/134 D |
| 4,640,324 | 2/1987 | Lounds | 144/134 D |
| 4,685,496 | 8/1987 | Livick | 144/134 D |
| 4,860,809 | 8/1989 | Cotton et al. | 144/134 D |
| 4,877,938 | 12/1990 | Greeson | 144/134 D |
| 4,921,023 | 5/1990 | Pempek | 144/136 C |
| 5,013,196 | 5/1991 | Friegang | 409/182 |
| 5,048,580 | 9/1991 | Smith | 144/134 D |
| 5,062,460 | 11/1991 | DeLine | 144/136 C |
| 5,285,831 | 2/1994 | Woolgar | 144/1 F |

FOREIGN PATENT DOCUMENTS

| 630729 | 11/1961 | Canada | 144/134 D |
|---|---|---|---|
| 3917812 | 12/1990 | Germany | 144/134 D |

Primary Examiner—W. Donald Bray
Attorney, Agent, or Firm—Brooks & Kushman

[57] ABSTRACT

A sub-base is provided for a router adapted to engage a stationary guide while cutting a workpiece. The sub-base includes a plate and an elongated guide-edge. The guide-edge extends from a linear edge of the plate in a manner as to lie in outboard shielding relationship to the router base. The sub-base further includes means for detachably securing the plate to the base with the guide-edge outboard of the base. The plate is positioned such that a generally planer surface of the plate engages the workpiece and the guide-edge extends to engage the stationary guide. The router bit extends through a central opening in the base and further extends through a central opening in the plate of the sub-base to cut the workpiece.

19 Claims, 2 Drawing Sheets

ROUTER SUB-BASE

TECHNICAL FIELD

The present invention relates to routers having sub-bases.

BACKGROUND ART

Routers are used to remove material from surfaces for decorative and functional purposes. Routers typically have a base, and a motor disposed in a housing. The motor drives a rotatable shaft which extends outward beyond the lower end of the housing with the shaft adapted to have a router bit secured thereto. The router bit extends through a central opening in the base to cut a workpiece.

Existing routers use a cast base typically formed of aluminum and having one side machined to create a planer guide face. When cutting a workpiece, a user slides the bottom of the router base across the workpiece with the guide face of the router base sliding along a stationary guide to assure a smooth cut. The stationary guide is sometimes clamped to the workpiece. Some routers have a sub-base attached to the bottom of the router base which protects the workpiece engaging portion of the router base from scratches and other defects. Other routers have sub-bases which are designed as guides to facilitate specific router applications. Examples of router sub-bases are disclosed in U.S Pat. Nos. 2,943,655, issued to Pedersen et al.; 3,119,207, issued to Nall; 3,635,268, issued to Lange; 4,044,805, issued to Gronholz; 4,685,496, issued to Livick; Re. 33,045, issued to Gronholz, deceased et al.; 4,921,023, issued to Pempek; 4,977,938, issued to Greeson; 5,048,580, issued to Smith; 5,062,460, issued to DeLine; and 5,285,831, issued to Woolgar.

A primary disadvantage associated with existing routers, including those with a cast aluminum base, is the fact that in order to provide an adequate planer guide face on the router base for sliding along the stationary guide, the router base must undergo a machining operation to smooth the coarse surface that is formed during casting. During mass production, performing this machining operation adds expenses and time to the manufacture of routers.

Furthermore, after a period of use, the guide face of the router base may begin to develop burrs and other surface deformities. These deformities may disrupt the otherwise smooth sliding of the guide face along the guide causing disturbance during the routing process. In order to correct this deficiency, it is necessary to remachine the guide face of the router base, or to replace the entire router base.

For the foregoing reasons, there is a need for a router which overcomes the problems and limitations of the prior art.

DISCLOSURE OF THE INVENTION

It is an object of the present invention to provide a router sub-base with a shielding guide-edge which eliminates the need to machine a planer guide face on the router base, thereby reducing the expense and amount of time needed to manufacture a router.

It is another object of the present invention to provide a router sub-base with a shielding guide-edge which is adapted to engage a stationary guide and to protect a portion of a router base, which in the absence of the sub-base would engage the stationary guide, from burrs and other surface deformities, thereby prolonging the life of the router base.

It is a further object of the present invention to provide a router sub-base with a shielding guide-edge having a resilient contact surface such as plastic that will not gouge the workpiece as the workpiece is being cut thereby being resistant to surface defects and providing smooth sliding of the sub-base along a stationary guide as the workpiece is cut.

In carrying out the above objects and other objects and features of the present invention, a sub-base is provided for a router adapted to engage a stationary guide while cutting a workpiece. The router has a base with a central opening, a housing with a motor disposed therein, and a rotatable shaft drivable by the motor. The shaft has a collet for receiving and supporting a router bit through the opening in the base to cut the workpiece. The sub-base comprises a plate and a straight elongated guide-edge. The plate has a generally planer surface for cooperating with the workpiece, a linear edge, and a central opening. The central opening in the plate is adapted for communication with the central opening in the base and for receiving the router bit therethrough. The straight elongated guide-edge is affixed to the plate linear edge and extends perpendicularly away from the plate planer surface in a manner as to lie in outboard shielding relationship to the base. The sub-base further includes means for detachably securing the plate to the base with the central opening of the plate in communication with the central opening of the base and with the guide-edge outboard of the base. The plate is positioned such that the plate planer surface engages the workpiece and the guide-edge extends to engage the stationary guide. The router bit extends through the openings in the base and the plate to cut the workpiece.

In a preferred construction, the plate and the router base are both generally D-shaped in plan view. The linear edge of the D-shaped plate lies along the straight side thereof, and the guide-edge extends from the plate linear edge. The guide-edge extends sufficiently alongside the base to shield substantially all of the base. The guide-edge and plate are integral and formed of a resilient material such as plastic which has the characteristic of avoiding gouging the workpiece as the workpiece is being cut. The sub-base further includes a plurality of spaced apart support ribs for securing the guide-edge to the plate, each support rib extending between the guide-edge and the plate.

Further in the preferred construction, the plate contains a plurality of circumferentially spaced apart apertures each for receiving a fastener such as a screw therethrough.

The advantages accruing to the present invention are numerous. For example, the sub-base can be inexpensively replaced in the event that replacement is needed.

The above objects and other objects, features, and advantages of the present invention will be readily appreciated by one or ordinary skill in the art from the following detailed description of the best mode for carrying out the invention when taken in connection with the accompanying drawings.

BEST MODES FOR CARRYING OUT THE INVENTION

Figure 1:
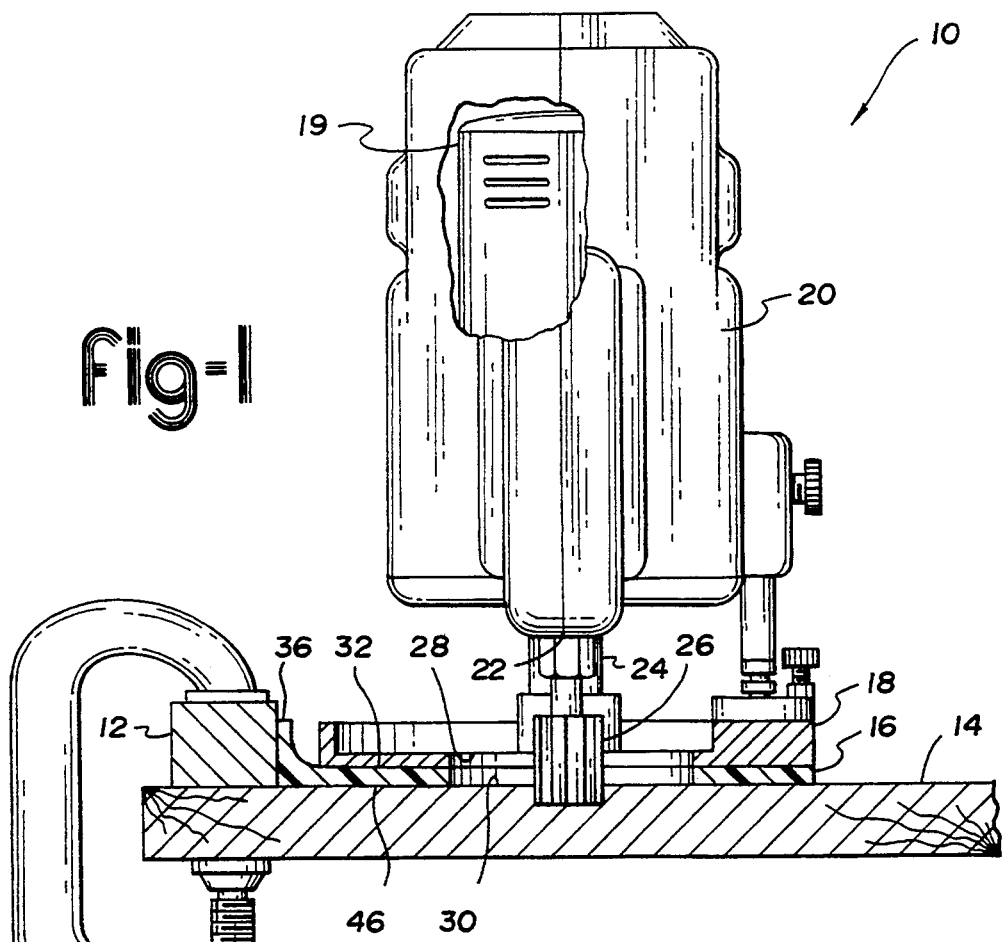
FIG. 1 shows a side elevation, partially in section, of a router in a workplace environment, the router has a sub-base made in accordance with the present invention.

Referring now to FIG. 1, there is illustrated a router 10 adapted to engage a stationary guide 12 while cutting a workpiece 14. Attached to the router 10 is a sub-base 16.

The router has a base 18 and a motor 19 disposed in a housing 20. The motor 19 drives a rotatable shaft 22, the shaft 22 has a collet 24 for receiving and supporting a router bit 26. The collet 24 supports the router bit 26 through a first central opening 28 located in the base 18, through a second central opening 30 located in the sub-base 16, and into active cutting contact with the workpiece 14.

Figure 2:
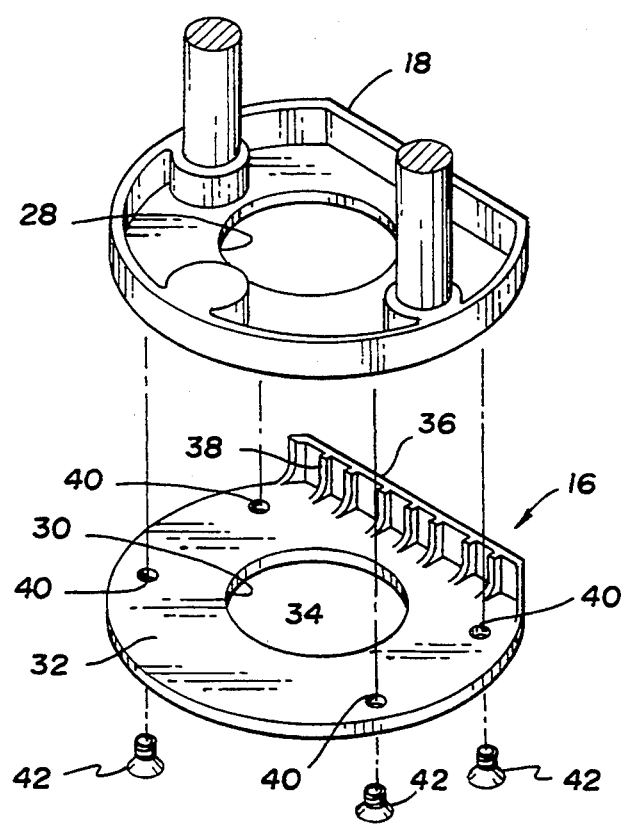
FIG. 2 is an exploded view showing the base and the sub-base of the router of FIG. 1.

Referring to FIGS. 1 and 2, the base 18 is generally D-shaped. Of course, it should be appreciated that the base 18 may be shaped differently if so desired. The sub-base 16 is primarily composed of two components. The first component is a generally D-shaped plate 32 having a generally planer surface 46 which cooperates with the workpiece 14, and further having a linear edge 34 located so as to lie outboard of the base 18 when the sub-base 16 is attached to the base 18. Alternatively, the sub-base 16 may be of any shape having a linear edge such as linear edge 34, and the sub-base 16 is not required to be the same shape as the base 18. For example, the router could have a round base and a rectangular sub-base with a linear edge adapted to lie outboard of the base.

The central opening 30 in the sub-base 16 is located in the plate 32 and is adapted for communication with the central opening 28 in the base 18 for receiving the router bit 26 therethrough. The second component of the sub-base 16 is an elongated guide-edge 36. The guide-edge 36 extends from the linear edge 34 of the plate 32 sufficiently alongside the base 18 and lies in outboard shielding relationship to the base 18 and shields substantially all of the base 18. However, it should be appreciated that there are many alternative embodiments for an outboard shielding guide-edge such as guide-edge 36. For example, the guide-edge 36 could extend to shield one half of the base, or a plurality of smaller guide-edges could be aligned linearly to function as would one long guide-edge. The sub-base 16 further includes support ribs 38. Each rib 38 extends between the guide-edge 36 and the plate 32. In the preferred embodiment, the plate 32 and the guide-edge 36 are integral and formed by the injection molding of a resilient material such as plastic which will not gouge the workpiece 14 as the workpiece 14 is being cut. Other means of attaching the guide-edge 36 to plate 32 are contemplated such as solvent welding, adhesive bonding, or the like.

With reference to FIG. 2, the plate 32 contains spaced apart apertures 40 for receiving fasteners such as screws 42 therethrough, the screws 42 thereby secure the sub-base 16 to the router base 18. It should be appreciated that there are various other ways of securing the plate 32 to the base 18. For example, instead of screws 42, bolts could be used. The plate 32 could also be secured to the base 18 by the use of an adhesive.

Figure 3:
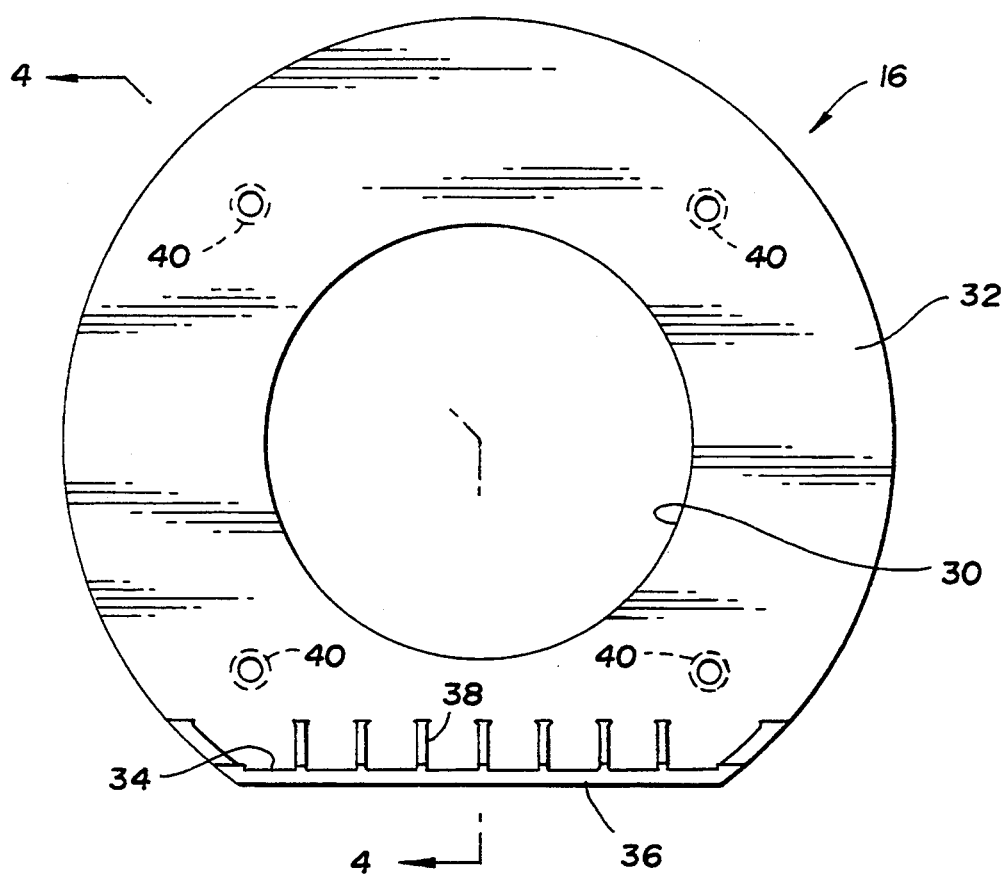
FIG. 3 is a top plan view of the sub-base of the present invention.

Referring to FIG. 3, the sub-base 16 is formed of the D-shaped plate 32 and the guide-edge 36 which extends along the entire linear edge 34 of the plate 32. The support ribs 38 are shown extending from the plate 32 and alongside the guide-edge 36 as a means to add rigidity to the guide-edge. The apertures 40 are located circumferentially about the plate 32 to receive fasteners or screws 42 therethrough, and to firmly secure the sub-base 16 to the base 18 as shown in FIG. 2.

Figure 4:
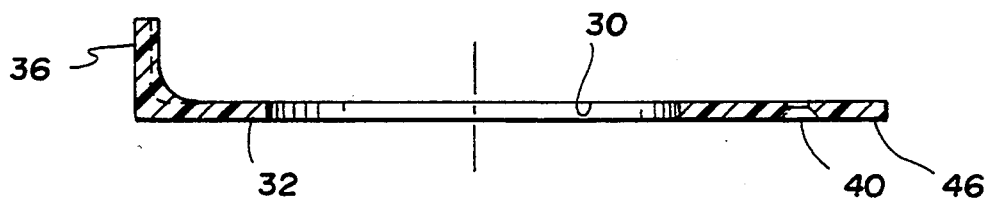
FIG. 4 is a sectional view of the sub-base of the present invention taken along line 4—4 of FIG. 3.

Referring to FIG. 4, the guide-edge 36 is shown substantially perpendicular to the plate planer surface 46 which cooperates with the workpiece.

With reference to FIG. 1, the router 10 is shown in a workplace environment. In operation, the stationary guide 12 is secured relative to the workpiece 14 by a clamp 44. As the workpiece 14 is cut, the plate planer surface 46 smoothly engages the workpiece 14, and the guide-edge 36 smoothly engages the stationary guide 12. The router bit 26 will cut the workpiece 14 as a user (not shown) slides the router 10 along the stationary guide 12.

It should be appreciated the router base 18 does not need to undergo a machining operation to create a straight edge because the sub-base 16 contains the shielding guide-edge 36. It should further be appreciated that the sub-base 16 is easily detachable by removing the screws 42. If the sub-base were to become worn after a period of use, it could quickly and inexpensively be replaced.

Although the present invention has been described in considerable detail with reference to certain preferred versions thereof, other versions are possible. For example, an embodiment of the sub-base of the present invention is achieved by a combination of two sub-base attachments, each having a guide-edge. The smaller sub-base attachments are secured on opposite sides of the bottom portion of the router base so as to create a recess therebetween which acts as a central opening for receiving the router bit therethrough. Another embodiment of the present invention is similarly achieved with a combination of a plurality of sub-base attachments. At least one of the attachments has a guide-edge portion. The remaining attachments each have a plate portion which is secured to the router base and cooperate with one another to prevent the router base from contacting the workpiece during operation.

It is to be understood, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. A sub-base for a router adapted to engage a stationary guide while cutting a workpiece, the router having a base with a central opening, a housing with a motor disposed therein, and a rotatable shaft drivable by the motor, the shaft having a collet for receiving and supporting a router bit through the opening in the base for cutting the workpiece, the sub-base comprising:

a plate having a generally planer surface for cooperating with the workpiece, a linear edge, and a central opening adapted for communication with the central opening in the base and for receiving the router bit therethrough;

a straight elongated guide-edge affixed to the plate linear edge and extending perpendicularly away from the plate planer surface in a manner as to lie in outboard shielding relationship to the base; and means for detachably securing the plate to the base with the central opening of the plate in communication with the central opening of the base and with the guide-edge outboard of the base, wherein the plate is positioned such that the plate planer surface engages the workpiece and the guide-edge extends to engage the stationary guide, and wherein the router bit extends through the openings in the base and the plate to cut the workpiece.

2. The sub-base of claim 1 wherein the plate is substantially the same plan view shape as the base.

3. The sub-base of claim 2 wherein the base and the plate are generally D-shaped in plan view.

4. The sub-base of claim 1 further comprising a plurality of spaced apart support ribs for securing the guide-edge to the plate, each support rib extending between the guide-edge and the plate.

5. The sub-base of claim 1 wherein the guide-edge extends sufficiently alongside the base to shield substantially all of the base.

6. The sub-base of claim 1 wherein the plate and the guide-edge are formed of a resilient material having the characteristic of avoiding gauging the workpiece as the workpiece is being cut.

7. The sub-base of claim 6 wherein the guide-edge is integral with the plate.

8. The sub-base of claim 1 wherein the means for detachably securing comprises a plurality of fasteners and wherein the plate contains a plurality of circumferentially spaced apart apertures each for receiving one of the fasteners therethrough.

9. A sub-base for a router adapted to engage a stationary guide while cutting a workpiece, the router having a generally D-shaped base with a central opening, a housing with a motor disposed therein, and a rotatable shaft drivable by the motor, the shaft having a collet for receiving and supporting a router bit through the opening in the base for cutting the workpiece, the sub-base comprising:

a generally D-shaped plate having a generally planer surface for cooperating with the workpiece, a linear edge, and a central opening adapted for communication with the central opening in the base and for receiving the router bit therethrough;

a straight elongated guide-edge affixed to the plate linear edge and extending perpendicularly away from the plate planer surface in a manner as to lie in outboard shielding relationship to the base and sufficiently alongside the base to shield substantially all of the base;

a plurality of spaced apart support ribs for securing the guide-edge to the plate, each support rib extending between the guide-edge and the plate; and means for detachably securing the plate to the base with the central opening of the plate in communication with the central opening of the base and with the guide-edge outboard of the base, wherein the plate is positioned such that the plate planer surface engages the workpiece and the guide-edge extends to engage the stationary guide, wherein the router bit extends through the openings in the base and the plate to cut the workpiece, wherein the means for detachably securing comprises a plurality of fasteners and wherein the plate contains a plurality of circumferentially spaced apart apertures each for receiving one of the fasteners therethrough.

10. The sub-base of claim 9 wherein the plate and the guide-edge are formed of a resilient material having the characteristic of avoiding gouging the workpiece as the workpiece is being cut.

11. The sub-base of claim 10 wherein the guide-edge is integral with the plate.

12. A router adapted to engage a stationary guide while cutting a workpiece, the router having a base with a central opening, a housing with a motor disposed therein, and a rotatable shaft drivable by the motor, the shaft having a collet for receiving and supporting a router bit through the opening in the base for cutting the workpiece, the router further comprising:

a sub-base having a plate and a straight elongated guide-edge, the plate having a generally planer surface for cooperating with the workpiece, a linear edge, and a central opening adapted for communication with the central opening in the base and for receiving the router bit therethrough, the straight elongated guide-edge affixed to the plate linear edge and extending perpendicularly away from the plate planer surface in a manner as to lie in outboard shielding relationship to the base, and the sub-base further including means for detachably securing the plate to the base with the central opening of the plate in communication with the central opening of the base and with the guide-edge outboard of the base, wherein the plate is positioned such that the plate planer surface engages the workpiece and the guide-edge extends to engage the stationary guide, and wherein the router bit extends through the openings in the base and the plate to cut the workpiece.

13. The router of claim 12 wherein the plate is substantially the same plan view shape as the base.

14. The router of claim 13 wherein the base and the plate are generally D-shaped in plan view.

15. The router of claim 12 further comprising a plurality of spaced apart support ribs for securing the guide-edge to the plate, each support rib extending between the guide-edge and the plate.

16. The router of claim 12 wherein the guide-edge extends sufficiently alongside the base to shield substantially all of the base.

17. The router of claim 12 wherein the plate and the guide-edge are formed of a resilient material having the characteristic of avoiding gouging the workpiece as the workpiece is being cut.

18. The router of claim 17 wherein the guide-edge is integral with the plate.

19. The router of claim 12 wherein the means for detachably securing comprises a plurality of fasteners and wherein the plate contains a plurality of circumferentially spaced apart apertures each for receiving one of the fasteners therethrough.

* * * * *